United States Patent [19]
LaSala et al.

[11] Patent Number: 5,370,728
[45] Date of Patent: Dec. 6, 1994

[54] SINGLE BED PRESSURE SWING ADSORPTION SYSTEM AND PROCESS

[75] Inventors: Kimberly A. LaSala, Clarence Center; Herbert Schaub, East Amherst, both of N.Y.

[73] Assignee: Praxair Technology, Inc., Danbury, Conn.

[21] Appl. No.: 117,455

[22] Filed: Sep. 7, 1993

[51] Int. Cl.[5] .............................................. B01D 53/04
[52] U.S. Cl. ..................................... 95/101; 95/130; 96/144
[58] Field of Search ................................. 95/95–105, 95/117, 121, 122, 130; 96/108, 109, 114, 115, 143, 144

[56] References Cited

U.S. PATENT DOCUMENTS

| | | | |
|---|---|---|---|
| 3,142,547 | 7/1964 | Marsh et al. | 95/100 |
| 3,182,435 | 5/1965 | Axt | 96/114 |
| 3,313,092 | 4/1967 | Potts | 96/143 X |
| 3,399,510 | 9/1968 | Kauer, Jr. et al. | 95/98 |
| 3,430,418 | 3/1969 | Wagner | 55/25 |
| 3,788,036 | 1/1974 | Lee et al. | 95/101 |
| 4,021,210 | 5/1977 | Streich et al. | 95/100 |
| 4,065,272 | 12/1977 | Armond | 95/130 X |
| 4,194,890 | 3/1980 | McCombs et al. | 95/98 X |
| 4,477,264 | 10/1984 | Kratz et al. | 95/103 |
| 4,482,361 | 11/1984 | Whysall | 95/100 |
| 4,519,813 | 5/1985 | Hagiwara et al. | 95/130 X |
| 4,534,346 | 8/1985 | Schlaechter | 95/102 X |
| 4,561,865 | 12/1985 | McCombs et al. | 25/25 |
| 4,650,500 | 3/1987 | Patel | 95/100 |
| 4,816,039 | 3/1989 | Krishnamurthy et al. | 95/103 X |
| 4,948,391 | 8/1990 | Noguchi | 95/98 |
| 5,032,150 | 7/1991 | Knaebel | 95/98 X |
| 5,152,813 | 10/1992 | Coe et al. | 95/130 X |
| 5,228,888 | 7/1993 | Gmelin et al. | 95/130 X |
| 5,258,058 | 11/1993 | Coe et al. | 95/130 X |
| 5,258,060 | 11/1993 | Gaffney et al. | 95/130 X |
| 5,266,102 | 11/1993 | Gaffney et al. | 95/130 X |
| 5,268,023 | 12/1993 | Kirner | 95/130 X |

*Primary Examiner*—Robert H. Spitzer
*Attorney, Agent, or Firm*—Alvin H. Fritschler

[57] ABSTRACT

A single bed, air separation PSA system utilizes an external product surge tank to supply product oxygen and purge gas to the adsorbent bed. An equalization tank supplies void space gas to the bed for repressurization purposes.

12 Claims, 1 Drawing Sheet

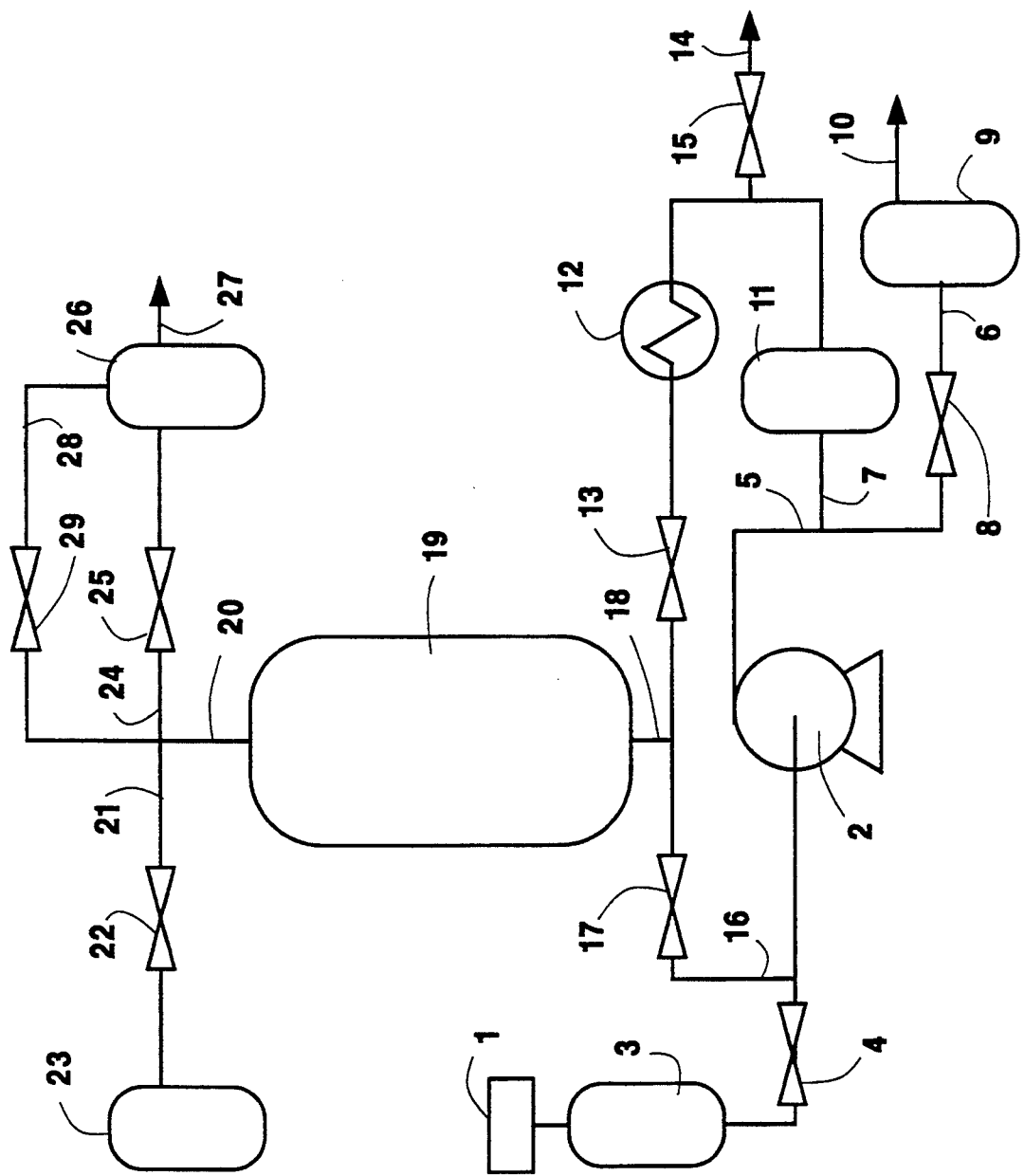

SINGLE BED PRESSURE SWING ADSORPTION SYSTEM AND PROCESS

BACKGROUND OF THE INVENTION

1. Field of the Invention

This invention relates to pressure swing adsorption systems for air separation. More particularly, it relates to the use of a single bed pressure swing adsorption system for the recovery of oxygen from air.

2. Description of the Prior Art

The pressure swing adsorption (PSA) process and system provides a commercially attractive approach for separating and purifying at least one component of a feed gas mixture containing at least one less readily adsorbable component and at least one more readily adsorbable component. Adsorption occurs in an adsorbent bed at an upper adsorption pressure, with the more readily adsorbable component thereafter being desorbed from the adsorbent bed by reducing the adsorbent bed pressure to a lower desorption pressure. The carrying out of the adsorption/desorption PSA process is well known and is disclosed, for example, in the Wagner patent, U.S. Pat. No. 3,430,418, relating to PSA systems having four or more beds. As disclosed in this patent, the PSA process is commonly carried out, on a cyclic basis, in a processing sequence that includes, in each bed, (1) pressure adsorption, with feed gas being introduced to the feed end of the bed and with release of the less readily adsorbable component, as product gas, from the product end of the bed; (2) cocurrent depressurization to intermediate pressure with release of void space gas from the product end of the bed; (3) countercurrent depressurization to a lower desorption pressure, with release of the more readily adsorbable component from the feed end of the bed, (4) optional purge at the lower desorption pressure, with purge gas being passed to the product end of the bed to enhance removal of the more readily adsorbable component, desorbed from the adsorbent bed, from the feed end of the bed; and (5) repressurization from the lower desorption pressure to the upper adsorption pressure, so that the cycle can be repeated with additional quantities of feed gas being passed to the bed. The void gas released during the cocurrent depressurization step is commonly employed for pressure equalization purposes between beds in the multi-bed system and to provide purge gas to a bed at its lower desorption pressure. Variations of such processing sequence are employed in the art for use in systems containing one or more adsorbent beds.

In numerous chemical processing refinery, metal production and other industrial applications, high purity gas streams are frequently employed for a variety of purposes. For example, high purity oxygen is used in various industries, such as chemical processing, steel mills, paper mills and in lead and glass production operations. Many such applications typically require oxygen purities in the 90–93% range, with flow rates of up to 100,000 ft.$^3$/hr or more. PSA processing is well suited for air separation to produce oxygen, and nitrogen, by various processing techniques such as indicated above, and variations thereof, particularly in operations of a relatively small size for which the use of a cryogenic air separation plant may not be commercially feasible. In such PSA systems designed for the recovery of high purity oxygen product as the less readily adsorbable component of air, such adsorbent bed will commonly contain an adsorbent material capable of selectively adsorbing nitrogen as the more readily adsorbable component of air, with said nitrogen being subsequently desorbed and removed from the bed upon reduction of bed pressure to the lower desorption pressure, as the cyclic adsorption/desorption sequence is carried out in the PSA system.

In PSA-oxygen and other PSA processing applications, it is desirable to minimize design, fabrication, transportation and equipment costs in order to achieve lower capital costs and increased system reliability. Accordingly, it is desirable to use PSA systems and processes that minimize the number of operating components, such as adsorbent vessels, adsorbent inventory, related tanks, valves, compression equipment, process lines and the like. The costs associated with the operation of PSA systems are minimized by the use of processes that require lower power per unit of product produced. Such process for oxygen production desirably exhibit high recovery of oxygen from feed air, while enabling low compression ratios to be employed in the associated compression equipment.

PSA systems containing four or more adsorbent beds, as in the Wagner patent referred to above, are desirable for certain gas separation operations, particularly to achieve high volume, high purity and high recovery performance. In other applications, it is possible and desirable to employ two or three bed PSA systems. For example, it has been found desirable to employ two bed PSA systems for various practical commercial PSA-oxygen applications. The inlet gas mixture to be separated is normally compressed to a higher pressure, usually several atmospheres, before the desired selective adsorption occurs. The resulting high pressure product gas e.g., the less selective oxygen component of feed air, is passed in a pipeline for downstream use. In typical 2-bed PSA operations, transatmospheric pressure conditions are employed. Thus, part of the cycle is run at pressures above atmospheric, and part at pressures below atmospheric pressure. The separation generally takes place at pressures very close to 1 atmosphere, and the product gas is then compressed to the desired downstream pressure. This has been found to be a cost-saving manner of operation, since the necessary gas compression is essentially that for product flow, not for the entire inlet feed gas stream. However, since the PSA processing cycle involves both pressure and vacuum conditions, two machines, i.e., a feed blower and a vacuum blower, are needed to implement the cycle. Such a 2-bed system is cost effective for oxygen plant capacities in the size range of 20,000 NCFH to 50,000 NCFH or more of oxygen. For applications with flow requirements that fall below this range, the capital costs associated with a two-bed vacuum pressure swing adsorption (VPSA) system make such processing uneconomical.

Single bed, single machine embodiments of the VPSA system have been proposed in the art to lower initial capital costs so as to render the VPSA system more suitable for lower flow rate applications. Since a large portion of the capital costs associated with a VPSA-oxygen plant relates to the cost of air blowers, the processing vessels, and the adsorbent for use in said vessels, it will be appreciated that the capital costs can be significantly reduced by cutting in half the number of blowers and the number of adsorbent vessels included in the system, whether for trans-atmospheric operations or systems in which vacuum conditions are not employed. In addition, a single bed PSA system employs much fewer valves than are needed to operate multi-bed PSA systems.

A single bed PSA system has been described by McCombs et al. in U.S. Pat. No. 4,561,865. In the McCombs et al. approach, a pressure controlled valve in the discharge line from the top of the adsorbent bed opens when the pressure at the top of the single processing vessel is at a certain level. Gas is passed in the discharge line directly to an external equalization tank. In the embodiment of the McCombs et al., there is also a by-pass line off the discharge line on the outlet of such pressure control valve, containing a check valve, said line passing to a product surge tank. When the pressure in the product surge tank is equal to that in the equalization tank, the check valve opens, and product gas is fed into the equalization tank and the product surge tank simultaneously. The check valve precludes the back flow from the product surge tank into the adsorbent bed when the bed pressure falls below that of the product surge tank. In this arrangement, the equalization tank serves as an extension of the product surge tank, since both tanks pressurize to the same top pressure, and contain the same purity gas. McCombs et al. also teach the use of a blowdown step to partially depressurize the adsorption vessel prior to evacuation.

While the McCombs et al. patent addresses the need in the art for a single bed PSA system, further improvement is needed in order to enable such single bed operation to satisfy the needs of the art with respect to low flow rate applications. More particularly, a higher product flow rate is desired in the art as compared to that obtainable by the McCombs et al. approach and other such single bed PSA systems.

It is an object of the invention therefore, to provide an improved, low volume PSA process and apparatus for the recovery of oxygen from air for low volume applications.

It is another object of the invention to provide an improved single bed PSA process and apparatus for the low volume recovery of oxygen from air.

It is a further object of the invention to provide a single bed, low volume PSA process and system for the enhanced flow of product oxygen recovered from air.

With these and other objects in mind, the invention is hereinafter described in detail, the novel features thereof being particularly pointed out in the appended claims.

SUMMARY OF THE INVENTION

The invention utilizes a single bed PSA or VPSA process and apparatus utilizing two external surge tanks. One such tank is an external product surge tank that supplies desired product, and also supplies purge gas to the adsorbent bed during the evacuation step of the PSA or VPSA processing cycle. The second surge tank, which serves as an equalization tank, is used to collect void space gas withdrawn from the bed during the depressurization thereof, and to supply void space gas therefrom to the adsorption bed during the repressurization thereof.

BRIEF DESCRIPTION OF THE DRAWING

The invention is hereinafter described in detail with reference to the accompanying drawing, which is a schematic flow diagram of a particular embodiment of the single processing bed, single machine VPSA system apparatus for the production of oxygen from air.

DETAILED DESCRIPTION OF THE INVENTION

The objects of the invention are accomplished using a single adsorbent bed PSA or VPSA system incorporating a single processing machine, i.e., a compressor to pressurize and to depressurize the single adsorbent bed during the processing cycle. A conventional product surge tank is employed, together with an equalization tank operated so as to improve product recovery and the power requirements of the system. By the practice of the invention, a significant improvement in performance is achieved in comparison with the prior art single bed PSA systems as represented by the McCombs et al. patent.

With reference to the drawing, line 1, used to supply feed air to feed blower/vacuum blower unit 2, contains dust filter-gas silencer unit 3 and valve 4, with line 5 from said unit 2 connecting to lines 6 and 7. Line 6 includes valve 8 and outlet snubber unit 9, from which gas is discharged through line 10. Line 7 includes outlet snubber unit 11, aftercooler 12 for feed gas cooling and valve 13. Discharge line 14, containing valve 15, is connected to line 7. Line 16 containing valve 17 connects to line 1 downstream of valve 4. Lines 7 and 16 both connect to line 18 that extends to the bottom portion of single adsorbent bed 19 in a suitable adsorption vessel. From the top of said adsorbent bed 19, line 20 extends to and connects with line 21, containing valve 22, passing to equalization tank 23, and with line 24, containing check valve 25, passing to product surge tank 26. Product oxygen is withdrawn from product surge tank 26 through line 27 for its desired use in downstream operations. Line 20 also connects with line 28, containing valve 29, which extends to said surge tank 26.

In the operation of a PSA process using the system as illustrated in the drawing, a five step processing cycle is desirably employed. Such cycle includes the following processing sequence: (1) pressurization/product recovery; (2) partial depressurization; (3) evacuation; (4) purge, and (5) partial repressurization.

In the operation of a particular embodiment of said processing sequence, the first step is begun after adsorbent bed 19 has just been partially repressurized to an intermediate pressure of about 10 psia. Feed air is supplied from feed blower 2, with valves 4 and 13 open, and valves 8, 15, 17, 22 and 29, closed. Check valve 25 is oriented so that it will open when the pressure in adsorbent bed 19 becomes greater than the pressure in product surge tank 26.

As feed air is introduced into the vessel containing adsorbent bed 19, the pressure in the vessel increases until a point is reached where the pressure is equal to that in product surge tank 26, typically at about 18 psia. Check valve 25 then opens, supplying product gas, i.e., oxygen, into product surge tank 26. The size of the product surge tank will vary with the desired product flow, and the outlet pipeline 27 pressure, but must be large enough to accommodate the flow of product gas from adsorbent bed 19, without a large swing in pressure, e.g., not more than 4–5 psi. It must also be able to accommodate the simultaneous purge flow from surge tank 26 back to adsorbent vessel 19 during the purge step, without interruption of product flow in pipeline 27. This supply of product gas continues until the pressure at the top of the vessel for adsorbent bed 19 reaches an upper adsorption pressure, typically about 22.5 psia.

At this point, the processing cycle advances to the second step of the processing sequence. As an alternative, a pressure control valve can be substituted for the check valve and operated in a manner to maintain a constant vessel pressure during the product make portion of the cycle step to further improve the process.

It should be noted that, during the remaining steps of the processing sequence, product surge tank 26 supplies product oxygen for downstream use, independently of the vessel for adsorbent bed 19 or other processing equipment associated therewith. A typical step time for the first step in the process is about 18–25 seconds. Feed air temperatures will correspond to ambient temperature, but, in general, the feed gas into adsorbent bed 19 is generally 30°–40° F. above ambient temperature, and the temperature profile in the adsorbent vessel is approximately 10°–20° F. below the ambient temperature at the bottom of the adsorbent level in the vessel, approximately ambient temperature or up to about 10° F. above ambient in the middle of the adsorbent bed; and approximately 30°–40° F. above ambient at the top of the adsorbent bed. These temperatures may vary slightly throughout the processing sequence. The feed air flow rate employed is directly related to the desired product flow rate. For 50% oxygen recovery at 90% product purity, the feed air flow rate will generally be about 9.5 times greater than the corresponding oxygen product flow rate.

As the second step of the processing sequence, i.e., partial depressurization, commences, valve 13 closes and valve 15 opens. This allows feed blower 2 to unload, i.e., to take air from the atmosphere and vent it back to the atmosphere. Valve 22 opens, and adsorbent bed 19 begins to depressurize from the upper adsorption pressure reached in the first step of the processing sequence. Void gas is thus displaced from the void volume of adsorbent bed 19 and is passed through line 21 to equalization tank 23. The size of this tank will vary with the desired plant size, i.e., product flow, but said equalization tank 23 needs to be large enough to hold said void gas from the adsorbent bed vessel at a pressure of about 14.5–15 psia. The concentration of oxygen in this tank is typically about 85–89% oxygen. Check valve 25 will close since the pressure of the adsorbent bed 19 vessel will fall below that of product surge tank 26. Valves 8, 17 and 29 remain closed during the processing step, which continues until the vessel pressure falls to an intermediate pressure, e.g., 16, psia, with the pressure in equalization tank 23 increasing to a pressure of 14.5–15 psia. The approximate cycle step time for this second, partial depressurization step, is about 4–7 seconds. The processing sequence then advances to the third step of the processing sequence. The temperatures of the vessel for adsorbent bed 19 during the second step are similar to those referred to in the first step referred to above.

The processing cycle advances to the third step of the processing sequence, i.e., vessel evacuation, after the vessel for adsorbent bed 19 has expelled a portion of void space gas into equalization tank 23, and the pressure in the adsorbent bed vessel has dropped to said intermediate pressure of approximately 16 psia. For purposes of the third processing step, valves 8 and 17 are opened, and valves 4, 15, 13, 22 and 29, and check valve 25, are closed. As a result, gas in adsorbent bed vessel 19 is diverted through the bottom of adsorbent bed vessel 19, and is passed through valve 17 in line 16 to the inlet of blower 2. This void gas is discharged through outlet silencer 9 to the atmosphere. This piping and valving arrangement enables blower 2 to evacuate vessel 19 to below atmospheric pressure. The approximate composition of the evacuation gas averaged over the evacuation portion of the processing cycle is 90% nitrogen and 10% oxygen. In order to enhance combination blower performance when it is used in vacuum service, seal water can be injected at the inlet of the blower in order to seal clearances in the lobes of blower 2. This water sealing means enables the blower to perform better in vacuum service. The vessel is evacuated below atmospheric pressure to cause the difference in partial pressures of the nitrogen gas in the void spaces of the adsorbent to desorb off the adsorbent surface, thus regenerating the adsorbent so as to prepare the adsorbent for re-adsorption of nitrogen from additional quantities of feed air for the semi-continuous flow of product oxygen for downstream use. This vessel evacuation step takes place until the pressure in the vessel reaches a desired lower desorption pressure, such as a vacuum desorption pressure, e.g., approximately 5 psia. The step time for this cycle step is about 30–40 seconds. The processing cycle then advances to the fourth step of the overall processing sequence.

The fourth processing step is a vessel purge step at the lower desorption pressure. For this purpose, valve 29 opens, and a small side stream of product gas from product surge tank 26 is diverted into the top of single adsorbent bed vessel 19. This stream has an oxygen concentration of 90–93%, and is used to sweep away a large portion of the remaining void gas in the vessel, which, at this point, is comprised mainly of desorbed nitrogen. The purge gas stream displaces the desorbed gas present in the void volume in vessel 19, and, since the purge stream does not have a high nitrogen concentration, the void gas will not re-adsorb into the adsorbent material surface when the pressure in the vessel begins to increase, since the adsorbent material does not have a selective affinity for oxygen. This vessel purge step occurs at a constant vacuum or other desorption pressure level in the vessel, with valves 8 and 17 remaining open, control valve 29 open, and all other valves closed. When most of the desorbed gas in the void spaces of the adsorbent in the vessel is replaced with product gas, the processing sequence is advanced to the fifth processing step, the partial repressurization step. The average length of time for the fourth, i.e., vessel purge step, is typically about 7–10 seconds. In order to hold the vacuum level essentially constant for this vessel evacuation step, the flow rate for the desorbed gas exiting the vessel is approximately equal to the evacuation flow rate, for example at 5 psia.

The fifth step of the processing sequence is a partial repressurization step in which valves 8, 17 and 29 are closed and valves 4 and 15 are opened to allow blower 2 to run unloaded. Control valve 22 is opened to a set valve position. Void gas that was collected in equalization tank 23 during the second step of the processing sequence, the partial depressurization step, is used to repressurize adsorbent vessel 19 to an intermediate pressure level, e.g., 10 psia, during this partial repressurization step. The pressure in equalization tank 23 falls, in a typical VPSA application, from approximately 15 psia to 9.5 psia. The time for this step is essentially the same as the step time for the partial depressurization step, e.g., 4–7 seconds. Once vessel 19 is repressurized to said intermediate pressure level, the processing sequence is complete, and the cycle is advanced to the first step thereof, and the processing sequence is repeated as continuous operation of the subject PSA or VPSA process is continued with additional quantities of feed air.

The approximate pressure levels in adsorbent bed 19, product surge tank 26 and equalization tank 23 at the end of each of the five steps of the processing sequence of a particular embodiment of the invention is shown in the following Table.

TABLE

Pressure Levels at the End of Each Processing Step

| | | | Pressure Level (PSIA) | | |
|---|---|---|---|---|---|
| Step | Time, Seconds | Processing Step | Adsorbent Bed | Product Surge Tank | Equalization Tank |
| 1 | 18–25 | Pressurization/ Product Recovery | 22.5 | 18–22 | 10 |
| 2 | 4–7 | Partial Depressurization | 16 | 21.5 | 14 |
| 3 | 30–40 | Vessel Evacuation | 5.0 | 19.5 | 14 |
| 4 | 7–10 | Vessel Purge | 5.5 | 18.75 | 14 |
| 5 | 4–7 | Partial Repressurization | 9.5 | 18.5 | 10 |

By the use of separate gas equalization tank for repressurization gas, particularly in VPSA processing operations, product recovery is improved, and power requirements are reduced. When the adsorbent vessel is at its upper adsorption pressure, and partial depressurization of the vessel is started, the gas that is expelled from the adsorbent bed is collected in said equalization tank. The collected gas is void gas, which is any gas that is contained in any of the vessel adsorbent void volumes resulting from adsorbent interstices, and any nitrogen gas that has been desorbed off the surface of the adsorbent when the bed pressure is decreased. The purity of the void gas in the equalization tank is different than that in the product surge tank because the void gas has a higher concentration of nitrogen gas since a portion of the gas collected in the equalization tank is desorbed nitrogen. In general, the oxygen purity in the equalization tank will be approximately 85–89% oxygen as contrasted to the higher purity, typically 90–93% oxygen, of the product gas in the product surge tank. After the adsorbent vessel has undergone evacuation, and is at a subatmospheric pressure level, the vessel is partially repressurized with void gas from this equalization or holding tank to a pressure of approximately 10 psia. By recycling the void gas from the partial depressurization step, rather than by blowing said void gas down to atmospheric pressure, as in prior art approaches, more of the oxygen molecules fed into the system are recovered, thus improving product recovery. The increase in product recovery means that, with the same inlet air flow, product oxygen flow is increased. This increase in product flow will result in lower unit power consumption for the PSA system. The incorporation of the equalization tank into the PSA, particularly the VPSA, process thus serves to improve product recovery and conserve unit power, two significant processing advantages at the relatively minor cost of the equalization tank.

Another advantageous feature of the invention is the use of product oxygen from the product surge tank as the purge gas during the evacuation step. When the adsorbent vessel is, for example, exposed to subatmospheric conditions, nitrogen gas adsorbed onto the adsorbent surface desorbes due to partial pressure differences. The desorbed nitrogen remains in the vessel in the void spaces of the adsorbent material. It is desirable to remove the bulk of such desorbed nitrogen from the adsorbent vessel, because, as soon as the pressure in the vessel is increased, partial pressures will drive the remaining nitrogen gas in the vessel to adsorb back into the surface of the adsorbent, so that the adsorbent is never fully regenerated. By introducing a purge gas stream from the product surge tank, which comprises 90–93% purity oxygen, the nitrogen gas remaining in the vessel is flushed out of the void spaces, and is replaced by product oxygen gas. When the bed is then repressurized, the void gas is composed principally of oxygen, which will not adsorb when the pressure in the vessel begins to rise, causing the adsorbent surfaces to remain fully regenerated in preparation for the next feed introduction step. In general, the higher the oxygen purity in the purge gas, the more effective the purge step becomes, because the more nitrogen gas that is left in the vessel, the more such gas will readsorb onto the adsorbent surface during the partial repressurization step, thus making the regeneration of the adsorbent surface less effective. When the purge gas introduced into the vessel has the least amount of nitrogen concentration possible, the desired air separation will be enhanced.

In the practice of the invention, it is found that a product flow rate improvement of 20–25% is achieved as compared to the prior art approach, whereby product gas is used as a source of bed repressurization gas. The use of product gas for repressurization can result in the availability of only a small portion of the total amount of such product gas for downstream use. By the use of void space gas for partial vessel repressurization, all of the product gas produced in the process of the invention is available for the desired downstream use of the product gas. This provides a distinctive performance advantage in the art of single bed PSA operations.

In the practice of the invention, any suitable adsorbent material capable of selectively permeating nitrogen from air can be employed. For example, well known molecular sieves, such as 5A and 13X zeolitic molecular sieve material can conveniently be employed.

While conventional zeolitic molecular sieves can be employed as the adsorbent material in the practice of the invention, various specially modified materials can also be used for the desired selective adsorption of nitrogen for feed air and the recovery of the less readily adsorbable oxygen component of feed air as the desired product gas. Thus, the adsorbent may, in particular embodiments be the lithium cation forms of zeolite X or mixed cation forms thereof, e.g., lithium and calcium forms. Such lithium X, i.e., LiX, adsorbent is found to exhibit a highly desirable capacity and selectivity toward the adsorption of nitrogen from air or other streams containing less polar or less polarizable molecular species, such as oxygen.

The LiX adsorbent materials desirably used in the practice of the invention are the lithium cation forms of zeolite X in which the framework $Si/Al_2$ molar ratio is from about 2.0 to about 3.0, preferably from 2.0 to 2.5, and in which at least about 88%, preferably at least 90%, more preferably at least 95%, of the $AlO_2$-tetrahedral units are associated with lithium cations. The nitrogen adsorption properties of such highly exchanged forms of LiX are totally unpredictable from the results obtainable using LiX materials in which 86 equivalent percent or less of the cations are lithium and the remainder are principally sodium cations. It has further been discovered that an increase in the relative proportion of $ALO_2$-tetrahedral units in the zeolite X framework from 44.4% of the total tetrahedral units to 50% of said total units, with a corresponding increase in Li+ ions, i.e., the same equivalent percent of Li+ ions in each case, also serves to increase the adsorption capacity and selectivity of the zeolite for nitrogen that is far greater than that related simply to the indicated increase in the number of cations in the LiX material.

In the preparation of the LiX materials for use in the practice of the invention, conventionally available zeolite X starting materials can readily be employed. Two such materials are zeolite X having $SiO_2/Al_2O_3$ ratios of 2.5 and 2.0, having principally sodium cations, i.e., NaX material. The 2.5 NaX can be synthesized hydrothermally at a temperature of about 100° C. using sodium silicate and sodium aluminate and water as the reagents in accordance with the teachings of the Milton patent, U.S. Pat. No. 2,882,244, with the reaction mixture having the following composition in terms of molar oxide ratios:

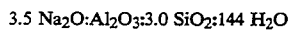

3.5 $Na_2O:Al_2O_3:3.0\ SiO_2:144\ H_2O$

The 2.0 NaX material can be synthesized in the mixed sodium-potassium form, as by first dissolving 208 grams of $Al(OH)_3$ in 267 grams of an aqueous 50% NaOH solution, using heating and stirring to form a first solution, i.e. solution (a). Solution (b) is prepared by dissolving 287 grams of 85.3% KOH pellets in 1,000 grams of water and then mixing the solution thus formed with 671 grams of an aqueous 50% NaOH solution. Solution (a) is slowly added to solution (b) to form solution (c), which is cooled to 4°–12° C. Solution (d) is prepared by diluting 453.25 grams of 40-grade sodium silicate (9.6% $Na_2O$; 30.9% $SiO_2$) with 1,131.7 grams of water. The cooled solution (c) is added to solution (d) in a blender and mixed at low speed for 3 minutes. The cooling and the avoiding of the creation of undue amounts of mechanical energy in the final mixing are important factors in the preparation of a high quality product. Gelling should not occur until after about 4 minutes. The gel is aged at 36° C. for 2–3 days and digested at 70° C. for 16 hours. The desired zeolite is then isolated by filtration, and the filter cake is rinsed with aqueous NaOH solution (pH of 12) in an amount equal to seven times the volume of the mother liquor. The rinsed product is reslurried in 4 liters of NaOh solution (pH of 10) and is then recovered by filtration and rinsed with water. The reslurry procedure is desirably repeated two more times, and the isolated product is dried in air. The dried product is slurried in 100 ml of 1% NaOH solution and is maintained in the slurry at 90° C. for 21 hours. After filtration, the cake is reslurried with 1,000 ml of NaOH solution (pH of 12) at 60° C. for 30 minutes and filtered. The reslurry process is desirably repeated twice more, and then the solids are recovered by filtration and washed with aqueous NaOH solution (pH of 9) and dried in air.

Using the 2.5 NaX as prepared above, a zeolite "preform" agglomerate can be produced by first washing the starting zeolite crystals with an aqueous caustic solution having a pH of 12 and consisting essentially of sodium hydroxide and water, and then washing with water to a pH of 9. The washed zeolite crystals are then admixed with Avery clay, a commercially available kaolin type clay, in the proportions of 80 weight % zeolite and 20 weight % clay. The zeolite clay mixture is then combined with sufficient water to produce an extrudable mass with sufficient green strength to enable the extruded pellets to undergo the subsequent firing step in which the kaolinitic clay is converted to an active meta kaolin form at a temperature of about 650° C. for about 1 hour. After firing, the bonded agglomerates are cooled and immersed and digested in an aqueous caustic solution at about 100° C. to convert the bulk of the meta-kaolin to zeolite crystals, mainly zeolite X crystals. The digested agglomerates are removed from the caustic digestion solution, again washed with a fresh aqueous NaOH solution having a pH of 9–10 and dried in air. The dried product pellets are broken and sieved to form particles having a convenient size, such as 16×40 mesh.

Such mesh particles can be activated by heating in a vacuum at a temperature of 375° C. for a period of about 2.5 hours. This activation is carried out carefully in this manner so that the zeolite NaX crystals are not subjected to undue hydrothermal abuse by the steam formed from occluded and/or adsorbed water. The activated material thus formed is a 2.5 NaX activated material.

In the preparation of LiX material, unactivated mesh particles may be subjected to an ion-exchange procedure whereby the particles are contacted in a glass column by a stream of a 1.0 Molar aqueous lithium chloride, adjusted to a pH of 9.0 using LiOH, at a temperature of 80° C. A quantity of lithium chloride solution is employed such that the zeolite particles are desirably contacted with a four-fold stoichiometric excess of lithium ions over a period for about 14 hours. The ion-exchange solution leaving the column is not recycled. The resulting ion-exchanged product is washed with water, and is adjusted to a pH of 9 using LiOH, and is found to be 94% ion-exchanged.

Using the low silica 2.0 NaKX material prepared as described above, the alkali metal cations can be replaced by lithium cations to the extent of greater than 99 equivalent percent, if desired, by ion-exchange with an aqueous lithium chloride solution (pH of 9, adjusted with LiOH). This material, in powdered form, comprises 2.0 LiX (99%) material.

Those skilled in the art will appreciate that various changes and modifications can be made in the details of the LiX preparation procedures, or in the preparation of mixed cation adsorbents, which do not form a part of the present invention related to improved PSA processing and systems. With this understanding, it should be noted that, for example, a 2.5 NaX material can be ion-exchanged using the volume technique described above with an aqueous lithium chloride solution (pH of 9, adjusted with LiOH) using either less or greater than the four-fold amount of LiCl so that products having various amounts of lithium cations are formed. It will also be appreciated that desirable LiX material can be prepared by such ion-exchange using lithium carbonate or other such lithium salt in place of lithium chloride. Likewise, the resulting LiX materials or mixed cation materials, such as LiCaX materials, constituting desirable adsorbents for use in particular embodiments of the invention, can be used under a variety of operating conditions corresponding to the practical operating requirements of a given application, e.g. a particular feed gas or product gas pressure or temperature condition, and/or to the desired level of separation and recovery pertaining in a given application.

Various other changes can be made in the details of the invention without departing from the scope of the invention as recited in the appended claims. Thus, a cylindrical-shaped adsorbent vessel, with shallow dished heads on the top and bottom thereof, is commonly employed, and with gas flow therethrough in an axial direction. Alternatively, an adsorbent vessel can be employed wherein gas flow is radial, i.e. with flow entering the outer cylindrical circumference and moving into the inner cylinder, where the product flow is collected. Since the flow area is a variable area cross-sectional flow path, the pressure losses associated with the flow will thereby be diminished, thus further cutting power consumption. In addition, the axial length of the adsorbent vessel can be made very long in order to fit more adsorbent, and thus produce more product, but the flow path length remains the radius of the vessel, and the pressure drop associated with radial flow does not change. Based on a Bed Size Factor (BSF) of 1,000 lb. of molecular sieve/TPD product flow, the flow range for this type of vessel configuration would be in the 15,000–80,000 NCFH oxygen flow rate, with 15,000–80,000 lb of molecular sieve adsorbent in the adsorption vessel.

It should be noted that VPSA plants employing lithium-exchanged adsorbents run very well in warm weather conditions when the feed temperatures can be controlled with cooling water in the feed aftercooler. In cold weather, however, when ambient temperatures are close to, or below freezing, the adsorbent temperatures are lowered, and adsorbent performance using lithium-exchanged adsorbents appears to be diminished. In order to increase the temperature in the adsorbent vessel, the feed air into the vessel can be heated to a level close to that pertaining during warm ambient conditions. This can be accomplished by adding a pre-heater to the inlet to the blower, in place of a feed aftercooler, in climates where the summer ambient temperatures are not above 75°–80° F.

In order to make a product flow unit more cost effective, the feed aftercooler and pre-heater features may be removed from particular embodiments of the invention. The reduction in product recovery due to varying ambient conditions, and resulting vessel temperatures, may not be of enough significance to justify the use of such component additions to the PSA or VPSA system. It is also within the scope of the invention to eliminate use of the inlet air silencer/snubber. Due to gas pulsation effects, this elimination is not recommended for large sized plants, but may be incorporated for smaller product flows, i.e. in the 5–10 TPD oxygen product range. Combination of the feed/vacuum discharge silencers, i.e. components 9 and 11, will also serve to simplify the PSA or VPSA system, and provide an overall cost savings in practical commercial embodiments of the invention.

In circumstances in which a higher purity product is desired, a sixth step, i.e. a secondary repressurization step can be employed. After the vessel has received a pressurization gas from the equalization tank at an oxygen purity of 85–89%, the sixth step would incorporate a small purge stream from the product surge tank to put higher purity oxygen gas, e.g. 90–93% purity, into the void areas of the adsorption vessel. In this manner, the average purity in the void spaces is increased, and higher purity oxygen product can be produced without a turn down in the product flow rate in order to achieve such increase in oxygen product purity, although at some sacrifice in product recovery.

The subject invention provides a significant improvement in single bed PSA and VPSA processing operations. By achieving improved product flow rates, and increasing the adsorptive capacity of the single adsorbent bed, the invention enhances single bed operations, and the desirability of employing low cost single bed PSA and VPSA systems in practical air separation operations.

We claim:

1. An improved pressure swing adsorption process for the recovery of oxygen from air, comprising:
   (a) passing feed air to a feed end of a single bed of adsorbent material capable of selectively adsorbing nitrogen, as the more adsorbable component of air, the pressure in the bed increasing from an intermediate pressure to an upper adsorption pressure, with oxygen, as the less adsorbable component of air, passing from a product end of the bed to a product surge tank at pressure approaching said upper adsorption pressure;
   (b) cocurrently depressurizing the bed to said intermediate pressure with the release of void space gas from the product end of the bed, said void space gas passing to an equalization tank;
   (c) countercurrently depressurizing the bed from said intermediate pressure to a lower desorption pressure, with the release of additional quantities of gas from the feed end of the bed;
   (d) passing a side stream of product gas from the product surge tank to the product end of the bed as purge gas to displace desorbed nitrogen from the void volume in the bed at the lower desorption pressure, the displaced desorbed nitrogen being discharged from the feed end of the bed; and
   (e) introducing void space gas from said equalization tank to the product end of the bed to increase the pressure in the bed from the lower desorption pressure to said intermediate pressure; and
   (f) passing additional quantities of feed air to the feed end of said single bed as cyclic operation of (a)–(e) above is continued, whereby product oxygen is recovered from air at the enhanced product flow rate, with the adsorptive capacity of the single bed of adsorbed material likewise being enhanced.

2. The process of claim 1 in which said lower desorption pressure is a subatmospheric pressure.

3. The process of claim 2 in which the upper adsorption pressure is above atmospheric pressure, and said intermediate pressure is below atmospheric pressure.

4. The process of claim 1 in which the adsorbent material comprises zeolitic molecular sieve material.

5. The process of claim 1 and including passing a small quantity of product gas from the product surge tank to the product end of the bed following the introduction of void space gas thereto in step (e), thereby increasing the average purity of oxygen in the void space of the bed.

6. An improved pressure swing adsorption system for the recovery of oxygen from feed air, comprising:
   (a) a single bed of adsorbent material capable of selectively adsorbing nitrogen, as the more adsorbable component of air;
   (b) an equalization tank for the holding of void space gas released from a product end of said bed;
   (c) a product surge tank for the holding of product oxygen released from the product end of said bed;

(d) conduit means for the passage of void space gas to the equalization tank and producer oxygen to said product surge tank;

(e) control means to control the flow of void space gas to the equalization tank and the flow of product oxygen to the product surge tank, and the flow of said void space gas and a side stream of said product oxygen from said tanks to the product end of said bed;

(f) feed blower means for the passage of air to a feed end of said bed; and (g) conduit means for the discharge of void space gas and nitrogen from the feed end of the bed, whereby product oxygen can be recovered in the pressure swing adsorption system at an enhanced product flow rate, and the adsorptive capacity of the single bed of adsorbent material can likewise be enhanced.

7. The system of claim 6 in which said control means to control the flow of product oxygen to the product surge tank comprises a check valve.

8. The system of claim 6 in which said control means to control the flow of product oxygen to the product surge tank comprises a pressure control valve.

9. The system of claim 6 in which the adsorbent material comprises zeolitic molecular sieve material.

10. The system of claim 9 in which said adsorbent material comprises lithium-exchanged zeolitic molecular sieve material.

11. The system of claim 6 in which said feed blower means comprises feed blower/vacuum blower means adapted to withdraw void space gas and nitrogen from the feed end of the bed to the conduit means for the discharge thereof at subatmospheric pressure.

12. The system of claim 6 and including an aftercooler downstream of the feed blower means for cooling the air passing to the feed end of the bed.

* * * * *